US007421907B2

(12) United States Patent
Ishikawa

(10) Patent No.: US 7,421,907 B2
(45) Date of Patent: Sep. 9, 2008

(54) ELECTROMAGNETIC FLOWMETER INCLUDING A FEEDBACK VOLTAGE DISTRIBUTED TO THE INNER CONDUCTOR OF THE SHIELDED CABLE AND THE INPUT CIRCUIT

(75) Inventor: Ikuhiko Ishikawa, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 4 days.

(21) Appl. No.: 11/716,431

(22) Filed: Mar. 8, 2007

(65) Prior Publication Data

US 2007/0283766 A1   Dec. 13, 2007

(30) Foreign Application Priority Data

Mar. 16, 2006   (JP)   ............................. 2006-071962

(51) Int. Cl.
*G01F 1/58* (2006.01)
(52) U.S. Cl. .................................................. 73/861.11
(58) Field of Classification Search ........................ None
See application file for complete search history.

(56) References Cited

U.S. PATENT DOCUMENTS 3,329,020 A    7/1967   Cushing
4,357,835 A *  11/1982  Kayama ................. 73/861.17

2003/0056602 A1   3/2003   Cushing

FOREIGN PATENT DOCUMENTS

| EP | 0 114 737    | 8/1984 |
| EP | 0 730 139    | 9/1996 |
| JP | 5-172602     | 7/1993 |
| JP | 5-231890     | 9/1993 |
| JP | 6-241856     | 9/1994 |
| JP | 7-27580      | 1/1995 |
| JP | 2004-138457  | 5/2004 |
| JP | 2004-219372  | 8/2004 |

OTHER PUBLICATIONS

The extended European Search Report. Dated Jul. 10, 2007.

* cited by examiner

*Primary Examiner*—Harshad Patel
(74) *Attorney, Agent, or Firm*—Edwards Angell Palmer & Dodge LLP; John J. Penny, Jr.; Brian R. Landry

(57) ABSTRACT

An electromagnetic flowmeter includes: a detector for detecting a flow rate voltage; a shielded cable having an inner conductor provided around a cable core to which the flow rate voltage is applied from the detector; and a converter for receiving the flow rate voltage via the shielded cable, and performing a signal processing on the received flow rate voltage so as to output the processed flowrate voltage, wherein a preamplifier of the converter includes: an input circuit which is connected between the cable core and a common voltage point and has an input voltage dividing point for dividing the flow rate voltage; a main amplifier circuit which amplifies the flow rate voltage; and a feedback voltage distribution section which receives an output voltage from the main amplifier circuit, and distributes the output voltage as positive feedback voltages to the inner conductor and the input circuit respectively with different ratios.

6 Claims, 4 Drawing Sheets

ELECTROMAGNETIC FLOWMETER INCLUDING A FEEDBACK VOLTAGE DISTRIBUTED TO THE INNER CONDUCTOR OF THE SHIELDED CABLE AND THE INPUT CIRCUIT

This application claims foreign priority based on Japanese Patent application No. 2006-071962, filed Mar. 16, 2006, the content of which is incorporated herein by reference in its entirety.

BACKGROUND OF THE INVENTION

1. Field of the Invention

The present invention relates to an electromagnetic flowmeter which converts a flow rate of fluid to be measured into an electric signal and performs a signal processing on the electric signal to obtain and output a flow rate signal. In particular, the present invention relates to an electromagnetic flowmeter which transmits an electric signal of fluid to be measured which has a low conductivity to a converter via a shielded cable.

2. Description of the Related Art

FIG. 2 is a schematic diagram showing the configuration of a first electromagnetic flowmeter of a related art. A detector 1 includes an excitation circuit 10, excitation coils 11A, 11B, detection electrodes 13A, 13B, a conduit pipe 14 (not shown), a grounding electrode 19 (liquid-contacting electrode), etc.

The excitation circuit 10 supplies an excitation current If with a predetermined waveform and a predetermined frequency to the excitation coils 11A, 11B, and also outputs a timing signal T1 necessary for signal processing to a converter 12.

The excitation coils 11A, 11B apply a magnetic field B having a waveform and a frequency corresponding to the excitation current If, to fluid Q to be measured (measuring fluid Q). The detection electrodes 13A, 13B are fixed to the insulative conduit pipe 14 by being insulated from the measuring fluid Q. These detection electrodes 13A, 13B are connected to input terminals of preamplifiers 15A, 15B of the converter 12 via terminals TA, TB, respectively. The measuring fluid Q is grounded via the grounding electrode 19.

The electric signals being outputted from the output terminals of the preamplifiers 15A, 15B are subjected to differential processing in a differential amplifier 16, and the processing result is outputted to a signal processing circuit 17. The signal processing circuit 17 performs signal processing, and outputs the result of the signal processing to the output terminal 18 of the converter 12 as a flow rate signal. The timing signal T1 is used at the time of the signal processing in the converter 12.

FIG. 3 is a diagram showing the detailed configuration of the preamplifiers 15A, 15B of the electromagnetic flowmeter shown in FIG. 2. Since either of the preamplifiers 15A, 15B is configured similarly, the following explanation will be made based on the preamplifier 15A. In the figure, the detector 1 is shown only on the electrode 13A side.

In the figure, Vd represents an electromotive force detected by the detection electrode 13A. The gate G of a field-effect transistor Q2 is connected to the detection electrode 13A and also connected to a common voltage point COM via a series circuit in which resistors R5 and R6 are connected in series.

The source S of the field-effect transistor Q2 is connected to a power source VSS via a resistor R7 and also connected to a non-inverted input terminal (+) of an operational amplifier Q3. The drain D thereof is connected to a power source VDD via a resister S8. Thus, the field-effect transistor Q2 serves as a source follower.

The output terminal TC1 of the operational amplifier Q3 is connected to the drain D of the field-effect transistor Q2 via a capacitor C3. Further, the output terminal TC1 is connected to the inverted input terminal (−) of the operational amplifier Q3 and also connected to a connecting point between the resistors R5 and R6 via a capacitor C4. A bootstrap circuit BS1 for performing positive feedback on the input side includes these resistors R5, R6 and the capacitor C4.

Since the resistor R5 and the field-effect transistor Q2 makes a high-impedance circuit, the high-impedance circuit is surrounded by a shielding plate 20. The shielding plate 20 is connected to the output terminal TC1, whereby both the shielding plate and the output terminal are held at the same voltage.

In the aforesaid configuration, since the field-effect transistor Q2 serves as the source follower, the amplification degree of this transistor is represented by $gm/[(1/R7)+gm]$, where gm represents a mutual conductance of the field-effect transistor Q2. Thus, the amplification degree of this transistor is almost 1 when the value of the resistor R7 is set to a large value.

Further, since the operational amplifier Q3 is configured as a voltage follower, the amplification degree of this transistor is also 1. Thus, since the amplification degree of the combination of the field-effect transistor Q2 and the operational amplifier Q3 is almost 1, this field-effect transistor and this operational amplifier are kept at the same voltage in view of alternating current.

Since the voltages of the gate G and the drain D of the field-effect transistor Q2 are the same, a capacitance $C_{GD}$ is not formed therebetween. Further, since the field-effect transistor Q2 serves as the source follower, the gate G and the source S thereof are kept at almost the same voltage in view of alternating current, so that a capacitance $C_{GS}$ is also not formed therebetween. In view of these facts, the input capacitance of the field-effect transistor Q2 is entirely removed.

Further, since the voltage at the output terminal of the operational amplifier Q3 is applied via the capacitor C4 to the connecting point between the resistors R5 and R6 which are connected between the gate G and the common voltage point COM, the voltage at the connecting point between the resistors R5 and R6 is substantially same as that of the gate G, so that a current does not flow through the resistor R5. Thus, impedance on the field-effect transistor Q2 side relative to the detection electrode 13A side is infinite.

Therefore, in the preamplifier 15A shown in FIG. 3, even when the inner resistance value of the detector 1 becomes high in such a case of measuring the measuring fluid Q having a low conductivity, etc., the preamplifier 15A of the converter 12 equivalently raises the input impedance of the preamplifier 15A by using the bootstrap circuit BS1 thereby to prevent attenuation of the signal at the time of receiving the electromotive force Vd.

In other words, the measuring fluid Q having a low conductivity can be measured without error by using the preamplifier 15A shown in FIG. 3.

FIG. 4 is a schematic diagram showing the configuration a second electromagnetic flowmeter of a related art. FIG. 4 is an example of another preamplifier 21 located at a corresponding position to the preamplifier 15A shown in FIG. 2. In this case, also the detector 1 is shown only on the detection electrode 13A side. This example shows a case in which the preamplifier 21 is connected via a shielded cable 23 to the detector 1 which has an inner resistor Rd between the grounding electrode 19 and the detection electrode 13A and generates the electromotive force Vd.

The shielded cable 23 is configured in a manner that a cable core 25 is covered by an inner conductor 24, the external portion of the inner conductor 24 is covered by an external conductor 26, and the external conductor 26 is grounded. A stray capacitance Cs1 is formed between the cable core 25 and the inner conductor 24, and a stray capacitance Cs2 is formed between the inner conductor 24 and the external conductor 26.

The detection electrode 13A is connected to the non-inverted input terminal (+) of an operational amplifier Q4 by the cable core 25 via the resistor R10. The output terminal TC2 of the operational amplifier Q4 is connected to the inverted input terminal (−) of the operational amplifier Q4, whereby the operational amplifier Q4 constitutes a voltage follower.

The output terminal TC2 is connected to the common voltage point COM via a series circuit of a resistor R11 and a resistor R12 of which resistance value is variable. The connecting point between the resistor R11 and the resistor R12 is connected to the inner conductor 24. Thus, the positive feedback is made with respect to the inner conductor 24, whereby the inner conductor 24 is shield-driven.

Supposing that the feedback ratio of the positive feedback is 1, for example, voltage of the cable core 25 and the voltage of the inner conductor 24 become the same, so that the influence of the stray capacitance Cs1 existing between the cable core 25 and the inner conductor 24 can be eliminated. Thus, a cable can be laid over a longer length.

As described above, since the preamplifier 21 shown in FIG. 4 can prevent the electromotive force Vd from being attenuated due to the stray capacitance Cs1 of the cable, it is effective to use the preamplifier in the case of measuring the measuring fluid which has a high conductivity and a large inner resistor Rd.

The related art references are JP-A-6-241856, JP-A-2004-219372, JP-A-5-172602, JP-A-5-231890, JP-A-7-27580, JP-A-2004-138457, for example.

In the case of measuring the measuring fluid having a low conductivity, the fluid having the low conductivity can be measured without error by the method of avoiding the attenuation of the electromotive force by raising the input impedance of the preamplifier in the case of FIG. 3, or by the method of avoiding the attenuation of the electromotive force due to the stray capacitance of the cable connecting the detector and the converter in the case of FIG. 4, respectively.

However, actually, in order to measure the fluid having a low conductivity by connecting the detector and the converter by the cable, it is required to raise the input impedance of the preamplifier and simultaneously to avoid the attenuation of the electromotive force due to the stray capacitance of the cable. In this case, it is necessary to realize such the two requirements by a single preamplifier.

SUMMARY OF THE INVENTION

The present invention has been made in view of the above circumstances, and provides an electromagnetic flowmeter which, in a case of measuring fluid having a low conductivity by connecting a detector and a converter by a cable, can improve the input impedance of a preamplifier and simultaneously can remove the influence due to the stray capacitance of the cable, by using a single preamplifier.

In some implementations, an electromagnetic flowmeter of the invention comprising:

a detector for detecting a flow rate voltage;

a shielded cable having an inner conductor provided around a cable core to which the flow rate voltage is applied from the detector; and a converter for receiving the flow rate voltage via the shielded cable, and performing a signal processing on the received flow rate voltage so as to output the processed flow rate voltage, wherein a preamplifier of the converter includes:

an input circuit which is connected between the cable core and a common voltage point and has an input voltage dividing point for dividing the flow rate voltage;

a main amplifier circuit which amplifies the flow rate voltage; and a feedback voltage distribution section which receives an output voltage from the main amplifier circuit, and distributes the output voltage as positive feedback voltages to the inner conductor and the input circuit respectively with different ratios.

According to the electromagnetic flowmeter of the invention, the feedback voltage distribution section distributes the output voltage as positive feedback voltages to the inner conductor and the input circuit respectively with different ratios. Thus, in spite of the double positive feedback, the flow rate signal can be transmitted to the converter without oscillating the system or without attenuating the signal in correspondence to the fluid conductivity and the cable length.

In the electromagnetic flowmeter, the feedback voltage distribution section divides the output voltage by a series connection of a first resistor, a second resistor and a third resistor, and distributes the output voltage as the positive feedback voltage to the input voltage dividing point with the feedback rate being 1, via a capacitor from a first voltage dividing point which is a connecting point between the first resistor and the second resistor.

According to the electromagnetic flowmeter of the invention, the feedback voltage distribution section includes the series connection of the first, second and third resistors, and makes the positive feedback with the feedback ratio of 1, to the input voltage dividing point via the capacitor from the first voltage dividing point at the connecting point between the first and second resistors. Thus, in addition to the effect attained by the above electromagnetic flowmeter, high input impedance can be assured and the attenuation of an electromotive force can be prevented.

In the electromagnetic flowmeter, the feedback voltage distribution section divides the output voltage by a series connection of a first resistor, a second resistor and a third resistor, and distributes the output voltage as the positive feedback voltage to the inner conductor from a second voltage dividing point which is a connecting point between the second resistor and the third resistor so that a ratio between the second resistor and the third resistor becomes an experiential ratio.

According to the electromagnetic flowmeter of the invention, the feedback voltage distribution section includes the series connection of the first, second and third resistors, and makes the positive feedback to the inner conductor, which is a capacitive load likely to oscillate, from the second voltage dividing point at the connecting point between the second and third resistors with a feedback ratio that a ratio between the second and third resistors becomes an experiential ratio. Thus, in addition to the effect attained by the above electromagnetic flowmeter, the lower limit of the fluid conductivity can be determined with the cable length corresponding to a predetermined accuracy at the experiential ratio.

In the electromagnetic flowmeter, the experiential ratio is in a range substantially from 0.99 to 0.90.

According to the electromagnetic flowmeter of the invention, the experiential ratio is set in a range substantially from 0.99 to 0.90 as a value corresponding to the predetermined accuracy, so that the operation of the flowmeter can be improved, advantageously.

DESCRIPTION OF THE PREFERRED EMBODIMENTS

Figure 1:
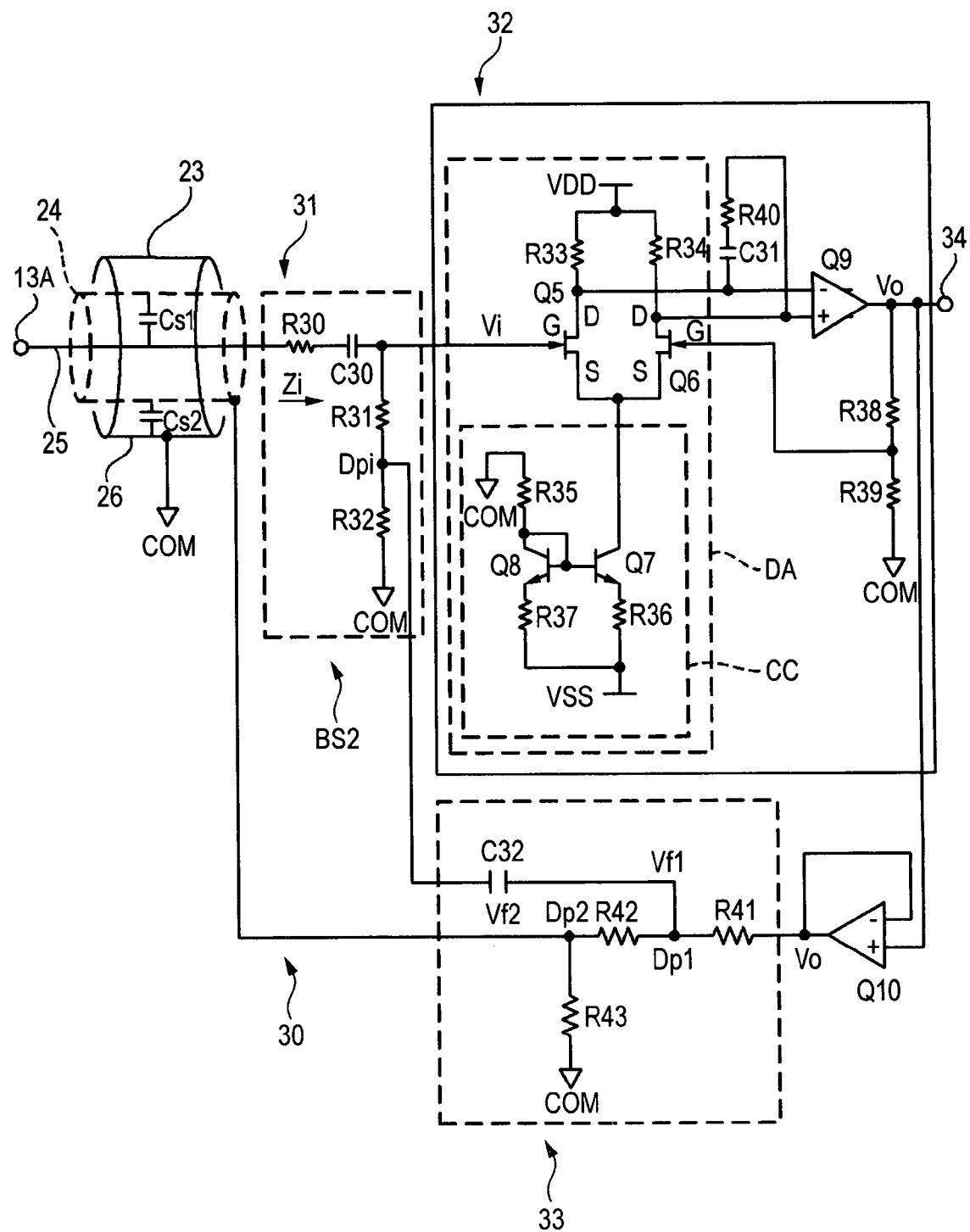
FIG. 1 is a diagram showing the configuration of an embodiment of the invention.
Figure 2:
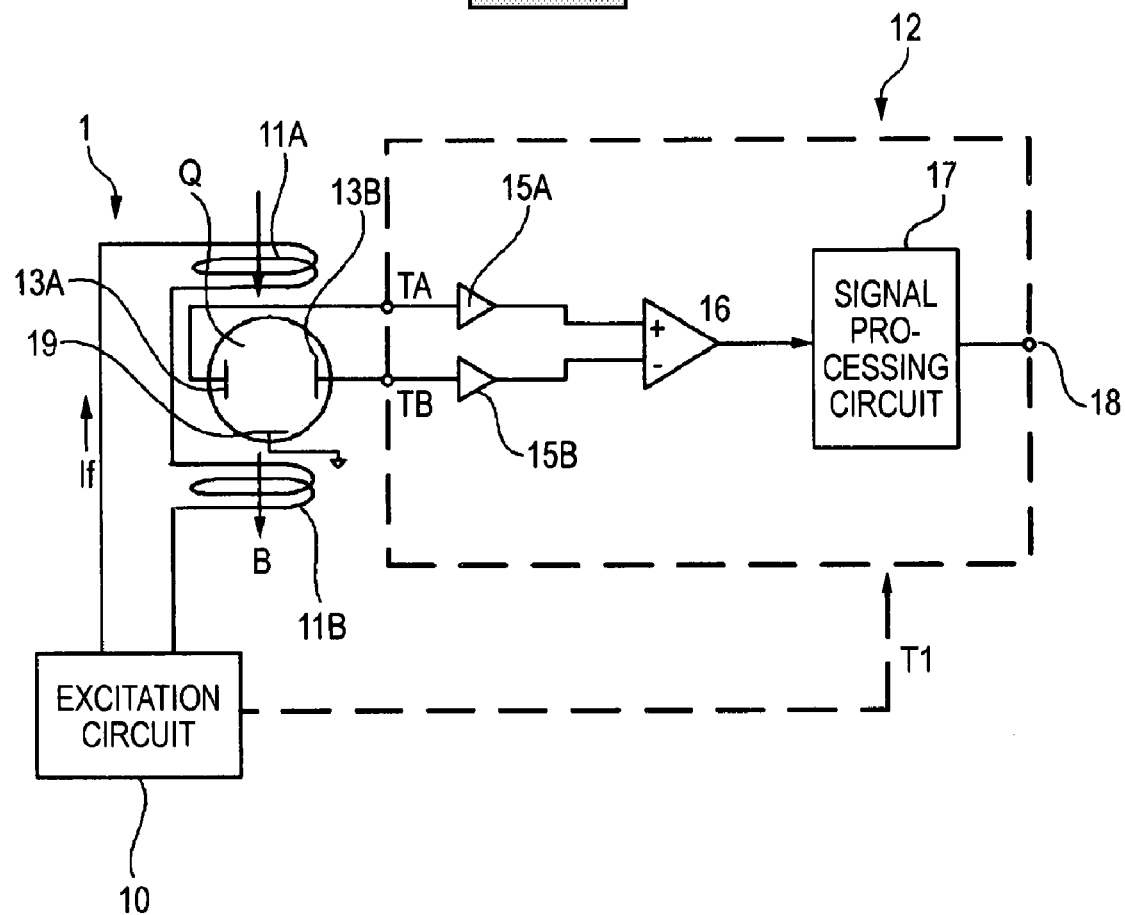
FIG. 2 is a schematic diagram showing the configuration of a first electromagnetic flowmeter of a related art.
Figure 3:
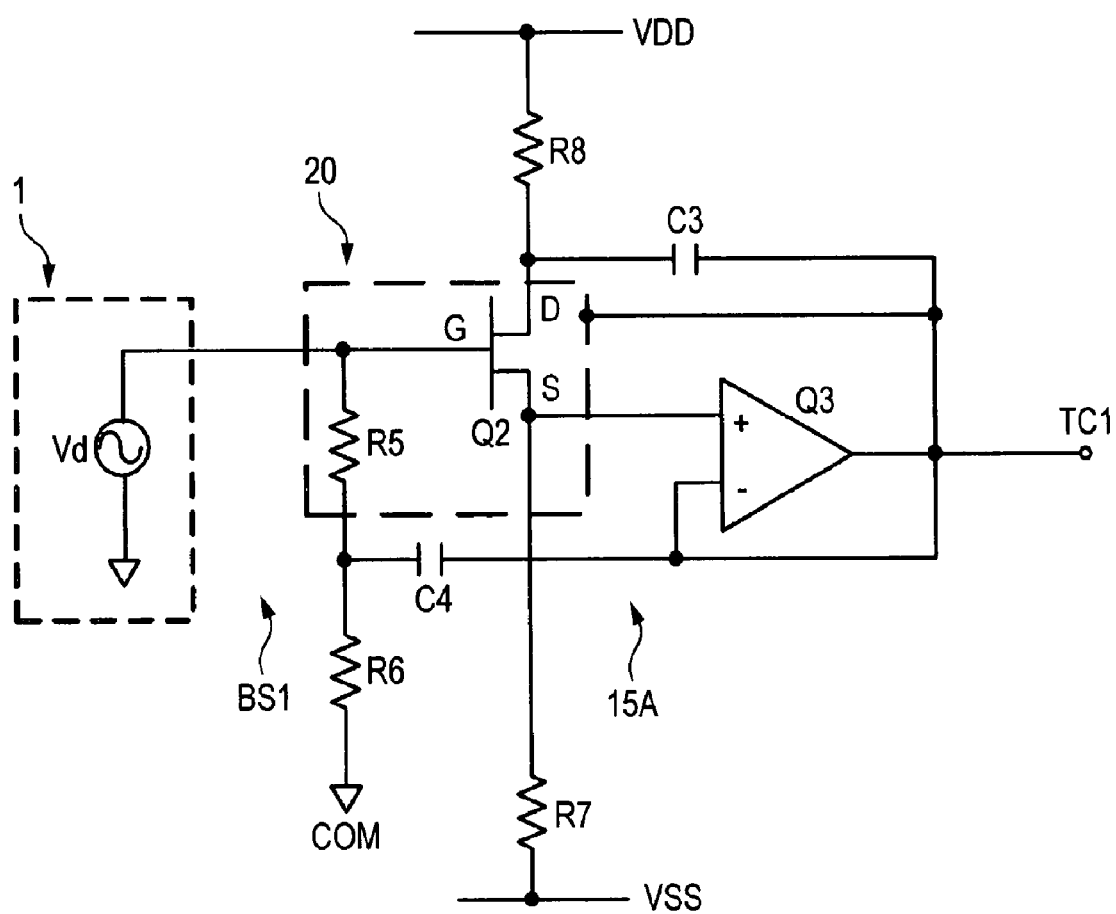
FIG. 3 is a diagram showing the detailed configuration of the preamplifier of the electromagnetic flowmeter shown in FIG. 2.
Figure 4:
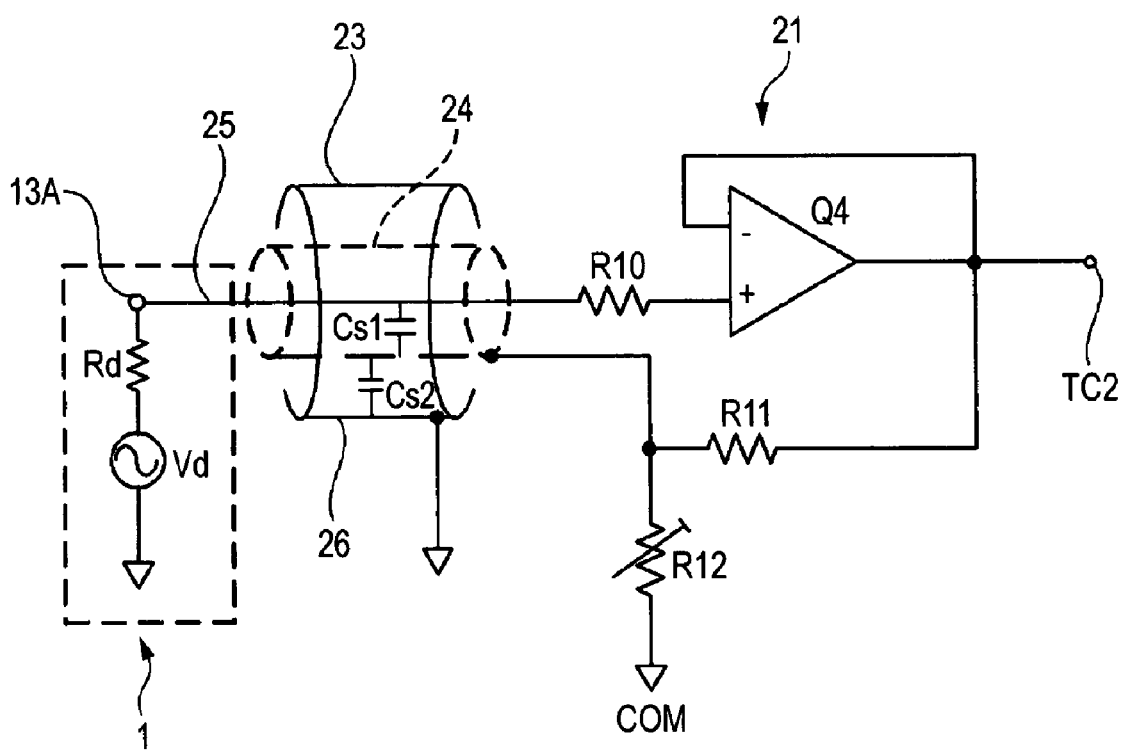
FIG. 4 is a schematic diagram showing the configuration of a second electromagnetic flowmeter of a related art.

Hereinafter, the invention will be explained in detail with reference to drawings. FIG. 1 is a diagram showing the configuration of the preamplifier of a converter according to an embodiment of the invention. In the following description, constituent elements having the same functions as those of the electromagnetic flowmeter of the related arts shown in FIGS. 2, 3 and 4 are referred by the same reference numerals and the explanations thereof is suitably omitted. A preamplifier 30 corresponds to the preamplifiers 15A, 15B shown in FIG. 2.

The preamplifier 30 includes an input circuit 31, a main amplifier circuit 32, a feedback voltage distribution section 33, etc.

In the input circuit 31, one end of a resistor R30 is connected to an electrode 13A, the other end thereof is connected to one end of a capacitor C30. The other end of the capacitor C30 is connected to the gate G of a field-effect transistor Q5. Further, the other end of the capacitor C30 is connected to a common voltage point COM via a series circuit of a resistor R31 and a resistor R32. The connecting point between the resistor R31 and the resistor R32 is an input voltage dividing point Dpi.

The main amplifier circuit 32 includes an operational amplifier Q9 and a differential amplifier DA having a constant current circuit CC as a constituent element, etc.

In the constant current circuit CC, a resistor R37, a transistor Q8 in which base and collector are connected to each other and a resistor R35 are connected in series between a power source VSS and the common voltage point COM. Further, the base of the transistor Q8 is connected to the base of a transistor Q7, and the emitter of the transistor Q7 is connected to the power source VSS via a resistor R36. As a whole, the constant current circuit serves as a current mirror circuit.

Further, in the differential amplifier DA, the collector of the transistor Q7 is connected to each of the sources S of the field-effect transistors Q5, Q6. The drain D of the field-effect transistor Q5 is connected to a power source VDD via a resistor R33. Further, the drain D of the field-effect transistor Q6 is connected to the power source VDD via a resistor R34.

Further, as for the operational amplifier Q9, the drain D of the field-effect transistor Q5 is connected to the inverted input terminal (−) thereof, the drain D of the field-effect transistor Q6 is connected to the non-inverted input terminal (+) thereof, and the output terminal of the operational amplifier Q9 is connected to an output terminal 34 and also connected to the common voltage point COM via a series circuit of a resistor R38 and a resistor R39. The connecting point between the resistor R38 and the resistor R39 is connected to the gate G of the field-effect transistor Q6.

A series circuit of a resistor R40 and a capacitor C31 is connected between the inverted input terminal (−) and the non-inverted input terminal (+) of the operational amplifier Q9. This series circuit is provided in order to eliminate high-frequency noise.

Next, the feedback voltage distribution section 33 includes a capacitor C32, and a voltage dividing circuit in which a resistor R41, a resistor R42 and a resistor R43 are connected in series in this order, etc. One end of the resistor R41 is connected to the output terminal of an operational amplifier Q10. The inverted input terminal (−) of the operational amplifier Q10 is connected to the output terminal thereof and the non-inverted input terminal (+) thereof is connected to the output terminal of the operational amplifier Q9. Thus, the operational amplifier Q10 act as a voltage follower.

The other end of the resistor R41 is connected to the resistor R42 and the connecting point therebetween is a first voltage dividing point Dp1. The connecting point between the resistor R42 and the resistor R43 is a second voltage dividing point Dp2. The other end of the resistor R43 is connected to the common voltage point COM. The first voltage dividing point Dp1 is connected to the input voltage dividing point Dpi of the input circuit 31 via the capacitor C32.

In the aforesaid configuration, in the main amplifier circuit 32, supposing that the input voltage applied to the gate G of the field-effect transistor Q5 is Vi and the output voltage of the operational amplifier Q9 is Vo, the voltage applied to the gate G of the field-effect transistor Q6 is [Vo·R39/(R38+R39)].

The operational amplifier Q9 operates so that the voltage difference between the inverted input terminal (−) and the non-inverted input terminal (+) of the operational amplifier Q9 becomes zero. In this case, the voltage of the drain D of the field-effect transistor Q5 is same as the voltage of the drain D of the field-effect transistor Q6. Since this is a state that the voltage of the gate G of the field-effect transistor Q5 is same as the voltage of the gate G of the field-effect transistor Q6, the following expression (1) is satisfied.

$$Vi = Vo \cdot R39/(R38+R39) \qquad \text{[Expression (1)]}$$

Thus, the amplification degree A of the main amplifier circuit 32 satisfies the following expression (2).

$$A = Vo/Vi = (R38+R39)/R39 = 1+(R38/R39) \qquad \text{[Expression (2)]}$$

In this manner, the amplification degree A of the main amplifier circuit 32 is increased because effectively the preamplifier 30 is hardly influenced by the input conversion noise of an amplifier connected at a rear stage of the preamplifier 30.

Further, a bootstrap circuit BS2 is formed by the capacitor C32 of the feedback voltage distribution section 33 and the resistors R31, R32 of the input circuit 31, whereby the input impedance Zi of the preamplifier 30 is increased. Thus, the attenuation of the electromotive force from the detector 1 is prevented.

To this end, the output voltage Vo is positively fed back as a feedback voltage Vf1 with a feedback ratio of 1 via the capacitor C32 to the input voltage dividing point Dpi which is the connecting point between the resistors R31 and R32, whereby a voltage equal to the input voltage Vi is applied to the input voltage dividing point Dpi. Thus, a current does not flow through the resistor R31 and so the input impedance Zi of the preamplifier 30 becomes infinite theoretically.

To be concrete, resistance values of the resistors R41, R42 and R43 are determined in view of the expression (2) so as to satisfy $1/[1+(R38/R39)]$. That is, the following expression (3) is satisfied.

$$1/[1+(R38/R39)]=(R42+R43)/(R41+R42+R43)=1/[1+R41/(R42+R43)] \quad \text{[Expression (3)]}$$

As a result, the following expression (4) is satisfied.

$$(R38/R39)=R41/(R42+R43) \quad \text{[Expression (4)]}$$

Next, under the resistance values of the resistors R41, R42 and R43 determined in the aforesaid manner, the voltage is positively fed back from the second voltage dividing point Dp2 to the inner conductor 24 of the shielded cable 23 as a shield drive. This feedback voltage Vf2 determines a ratio between the resistors R42 and R43 while maintaining the determined composite resistance value of the resistors R42 and R43.

When an experiential ratio K is approached to 1.0 (=100%) where the feedback voltage Vf2 becomes equal to the input voltage Vi, the amplifier itself is likely to oscillate since the cable is a capacitive load. In contrast, when the experiential ratio is approached to 0 (=0%), the oscillation can be prevented but the electromotive force attenuates due to the stray capacitance Cs1, thereby the accuracy is deteriorated.

Thus, the values of resistors R42 and R43 are determined experientially in view of the conductivity of the fluid and the kind and length of the cable, with respect to the predetermined accuracy. Usually, the experiential ratio K is set from about 0.9 to 0.99 (=90% to 99%) in an allowable accuracy range and a range in which the system does not oscillate.

As an experimental example, in a state where the bootstrap was applied with the feedback ratio of 1 and the experiential ratio K=0.91 (=91%) as for the shield drive, when the inner resistance Rd between the grounding electrode 19 and the detection electrode 13A was set to 500 KΩ (electric conductivity: 10 μs/cm) and the cable length was set to 10 m, the span error was −0.19% which satisfies the predetermined accuracy.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. An electromagnetic flowmeter, comprising:
   a detector for detecting a flow rate voltage;
   a shielded cable having an inner conductor provided around a cable core to which the flow rate voltage is applied from the detector; and
   a converter for receiving the flow rate voltage via the shielded cable, and performing a signal processing on the received flow rate voltage so as to output the processed flow rate voltage,
   wherein a preamplifier of the converter includes:
   an input circuit which is connected between the cable core and a common voltage point and has an input voltage dividing point for dividing the flow rate voltage;
   a main amplifier circuit which amplifies the flow rate voltage; and
   a feedback voltage distribution section which receives an output voltage from the main amplifier circuit, and distributes the output voltage as positive feedback voltages to the inner conductor and the input circuit respectively with different ratios.

2. The electromagnetic flowmeter according to claim 1, wherein the feedback voltage distribution section divides the output voltage by a series connection of a first resistor, a second resistor and a third resistor, and distributes the output voltage as the positive feedback voltage to the input voltage dividing point with the feedback rate being 1, via a capacitor from a first voltage dividing point which is a connecting point between the first resistor and the second resistor.

3. The electromagnetic flowmeter according to claim 2, wherein the feedback voltage distribution section distributes the output voltage as the positive feedback voltage to the inner conductor from a second voltage dividing point which is a connecting point between the second resistor and the third resistor so that a ratio between the second resistor and the third resistor becomes an experiential ratio.

4. The electromagnetic flowmeter according to claim 3, wherein the experiential ratio is in a range substantially from 0.99 to 0.90.

5. The electromagnetic flowmeter according to claim 1, wherein the feedback voltage distribution section divides the output voltage by a series connection of a first resistor, a second resistor and a third resistor, and distributes the output voltage as the positive feedback voltage to the inner conductor from a second voltage dividing point which is a connecting point between the second resistor and the third resistor so that a ratio between the second resistor and the third resistor becomes an experiential ratio.

6. The electromagnetic flowmeter according to claim 5, wherein the experiential ratio is in a range substantially from 0.99 to 0.90.

* * * * *